United States Patent [19]
Rock

[11] 3,983,329
[45] Sept. 28, 1976

[54] FAIL SAFE LOGIC MONITOR
[75] Inventor: Michael H. Rock, Glen Rock, N.J.
[73] Assignee: The Bendix Corporation, Teterboro, N.J.
[22] Filed: Mar. 17, 1975
[21] Appl. No.: 559,346

[52] U.S. Cl. .......................... 179/15 BF; 340/146.2
[51] Int. Cl.[2] .......................... H04J 3/00; G06F 7/02
[58] Field of Search .............. 179/15 BF; 340/146.2;
235/153 A, 153 AC; 244/77 M; 325/41, 42; 328/134

[56] References Cited
UNITED STATES PATENTS

| | | | |
|---|---|---|---|
| 3,688,099 | 8/1972 | Buscher | 244/77 M |
| 3,784,980 | 1/1974 | Geesen | 340/146.2 |
| 3,892,923 | 7/1975 | Ranner | 179/15 BF |

Primary Examiner—Thomas A. Robinson
Attorney, Agent, or Firm—Anthony F. Cuoco

[57] ABSTRACT

A fail safe logic monitor wherein a multi-bit logic word is multiplexed into a comparator and compared thereby with a multiplexed "hard wired" reference word. The comparator provides an output compatible with conventional a.c. fail safe fault logic. Features of the invention include self monitoring any single internal failure for indicating a fault while the monitor is on line and automatic test ability and compatibility with existing fault logic.

6 Claims, 1 Drawing Figure

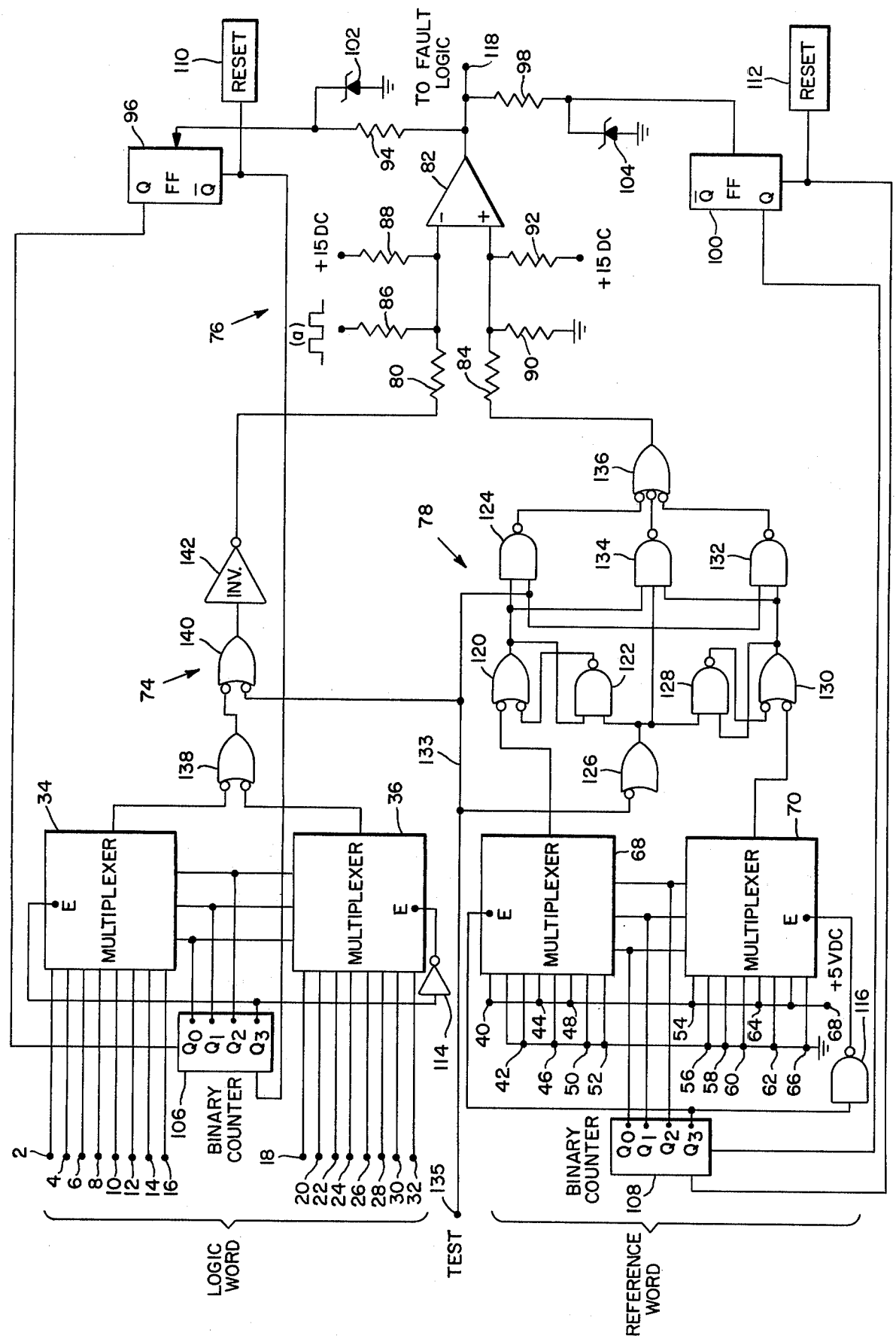

FAIL SAFE LOGIC MONITOR

BACKGROUND OF THE INVENTION

1. Field of the Invention

This invention relates generally to fail safe logic monitors and, more particularly, to a monitor for monitoring a multi-bit word in a fail safe manner.

2. Description of the Prior Art

Automatic flight control systems may contain dual monitored analog signal chains controlled by single thread modal logic. The modal logic can exhibit a failure that could cause multiple failures in the analog computation. The result of these failures is unpredictable in nature. Because of this, it has been necessary to devise means for determining the validity of the complete logic word.

SUMMARY OF THE INVENTION

This invention contemplates apparatus including a logic monitor having the capability of comparing a multi-bit digital word against a fixed reference word. A pair of multiplexers monitor the multi-bit digital word and another pair of multiplexers monitor the reference word. The outputs of the multiplexers are compared by a fail safe comparator. The comparator output is frequency divided and the divided output provides a clock for binary counters which set the multiplexer addresses. The comparator output has a square waveform as long as the outputs of both pairs of multiplexers are in substantial agreement. If at any address these outputs do not agree, the comparator will receive inputs at different logic levels and indicate a fault through a loss of the square wave output and reverts to a "hardover" state providing a constant level output. The clocks will thereupon stop, causing a latch condition in the failed step resulting in a system disconnect via fault logic.

The monitor is fail safe since any internal failure will cause the counters to be desynchronized resulting in a mismatch of multiplexer outputs and loss of the square wave output. The multiplexers monitoring the reference word are pre-tested to prevent multiple latent failures from inhibiting the fail safe characteristics of the device. This is accomplished by memorizing if each of the two reference multiplexers have switched during the pre-test. Both multiplexers must change state before a fault can be transmitted to the fault logic. This memorization is accomplished with a gating arrangement whereupon, if both multiplexers do not fault during the test sequence a "no go" is registered in the system automatic test circuitry, preventing the system from going into the monitored state.

The main object of this invention is to provide a fail safe monitor for monitoring a multi-bit logic word.

Another object of this invention is to implement the aforenoted monitoring by multiplexing the logic word and using a single comparator to compare the multiplexed logic word with a multiplexed "hard wire" reference word.

Another object of this invention is to provide a monitor of the type described which is fail safe since any mismatch of multiplexed outputs renders the monitor in a "hard over state.

Another object of this invention is to provide a monitor of the type described which is adaptable to pre-testing for indicating multiple latent failures which would otherwise inhibit the fail safe characteristics of the monitor.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE in the drawing is a combination block diagram-electrical schematic of a fail safe logic monitor according to the invention.

DESCRIPTION OF THE INVENTION

A logic word which may relate, for example, to the landing of an aircraft may include 16 bits designated by numerals 2–32. Bits 2–16 are applied to multiplexer 34 and bits 18 through 32 are applied to a multiplexer 36, both of said multiplexers being of the conventional type well known in the art.

A "hard wired" reference word has 16 bits designated by the numerals 40 through 68. Bits 40 through 52 are applied to a multiplexer 68 and bits 54 through 68 are applied to a multiplexer 70. Bit 66 is connected to ground while bit 68 is connected to, for example +5 volt d.c. source. Multiplexers 68 and 70 are also conventional and similar to multiplexers 34 and 46.

The outputs of multiplexers 34 and 36 are applied through gating means 74 including gates 138–142 to a comparator designated generally by the numeral 76, and the outputs of multiplexers 68 and 70 are applied through gating means 78 including gates 120–136 to comparator 76. Gatingn means 74 and 78 will be hereinafter more fully described.

The output from gate 142 in gating means 74 is applied to comparator 76 through a resistor 80 which is connected to an inverting input terminal (−) of a comparator amplifier 82. The output from gate 136 in gating means 78 is connected through a resistor 84 to a non-inverting input terminal (+) of comparator amplifier 82. A resistor 86 is connected to resistor 80 and is connected to a square wave signal source $a$, and a resistor 88 is connected intermediate resistor 86 and ther inverting input terminal (−) of amplifier 82 and is connected to a +15 volt d.c. source. A resistor 90 is connected to resistor 84 and is connected to ground and a resistor 92 is connected intermediate resistor 90 and the non-inverting input terminal (+) of amplifier 82 and is connected to a +15 volt d.c. source.

The output from comparator 76 at the output terminal of amplifier 82 is connected through a resistor 94 to a flip-flop 96. The output from amplifier 82 is connected through a resistor 98 to a flip-flop 100. A voltage limiting zener diode 102 is connected intermediate resistor 94 and flip-flop 96 and a voltage limiting zener diode 104 is connected intermediate resistor 98 and flip-flop 100.

Flip-flop 96 is connected to a binary counter 106 and flip-flop 100 is connected to a binary counter 108. Flip-flop 96 and counter 106 are reset by a reset signal source 110 and flip-flop 100 and binary counter 108 are reset by a reset signal source 112.

Counter 106 is connected at output terminals $Q_0$, $Q_1$ and $Q_2$ to input terminals of multiplexers 34 and 36 and is connected at an output terminal $Q_3$ to an enable terminal (E) of multiplexer 34. Output terminal $Q_3$ is connected through a gate 114 to an enable terminal (E) of multiplexer 36.

Counter 108 is connected at output terminals $Q_0$, $Q_1$ and $Q_2$ to multiplexers 68 and 70 and is connected at an output terminal $Q_3$ to an enable terminal (E) of multiplexer 68. Output terminal $Q_3$ is connected through a gate 116 to an enable terminal (E) of multiplexer 70.

OPERATION OF THE INVENTION

The outputs of multiplexers 34 and 36, gated through gating means 74 and the outputs of multiplexers 68 and 70 gated through gating means 78 are compared by fail safe comparator 76. The comparator output is frequency divided by flip-flops 96 and 100. The outputs of flip-flops 96 and 100 provide the clock inputs for binary counters 106 and 108 which set the addresses of multiplexers 34 and 36 and 68 and 70, respectively. The output of comparator 76 at the output terminal of amplifier 82 is a square wave output as long as the compared multiplexer outputs agree. If for any multiplexer address, the outputs do not agree the comparator will detect different logic levels and indicate a fault through a loss of the square wave output thereby reverting to a "hard over" state. This will cause counters 106 and 108 to stop, whereby a latched condition results in a system disconnect via fault logic connected to a system output terminal 118. In this connection it is noted that the monitor is fail safe since any internal failure will cause the address counters to become desynchronized, resulting in a mismatch of the multiplexer outputs and the described failure condition.

An important feature of the invention is that reference multiplexers 68 and 70 may be pre-tested to prevent multiple latent failures from inhibiting the fail safe characteristics of the device. This is accomplished by memorizing that each of the two multiplexers 68 and 70 have switched or changed state during the test sequence. In effect, both multiplexers must change state before a fault can be transmitted to fault logic output terminal 118. This memorization is accomplished through gates 120, 122, 124 and 126 interconnected to multiplexer 68 and through gates 126, 128, 130 and 132 interconnected to multiplexer 70, said gates 120–132 being included in gating means 78 as heretofore noted.

In further explanation of the pre-test feature of the invention a test line designated by the numeral 133 is connected to gating means 78 at inputs to gates 124 and 126 therein, and is connected to an input to gate 140 in gating means 74. Under normal test conditions, that is, when no test signal is applied, the input at a test terminal 135 connected to line 133 is at a "high" level. Gates 122, 128 and 134 in gating means 78 are disabled and gate 136 in said gating means is enabled. The output from multiplexer 68 is applied through gates 120, 124 and 136 to comparator 76, and the output from multiplexer 70 is applied through gates 130, 132 and 136 to the comparator.

Under test conditions, that is when a test signal is applied at test terminal 135, and which test signal is at a "low" level, gate 74 is effective for blocking the outputs from multiplexers 34 and 36. Gates 124 and 132 in gating means 78 are disabled. Gates 120 and 122 form a first flip-flop and gates 128 and 130 from a second flip-flop, with said first and second flip-flops being set by multiplexers 68 and 70 respectively.

It will now be seen from the aforenoted description of the invention with reference to the drawing that the aforenoted objects of the invention have been met. A fail safe monitor employing a single comparator for monitoring a multi-bit logic word is disclosed. A pretest sequence is available which indicates multiple latent failures which would otherwise inhibit the fail safe characteristics of the monitor. The device provides means for determining the validity of the complete logic word and thereby obviates the results of failures which may occur.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A fail safe system for monitoring a multi-bit logic word, comprising:
   first multiplexing means for multiplexing the multi-bit logic word;
   second multiplexing means for multiplexing a multi-bit reference word;
   first gating means connected to the first multiplexing means for gating the output therefrom;
   second gating means connected to the second multiplexing means for gating the output therefrom;
   comparator means connected to the first and second gating means and responsive to the gated outputs therefrom for providing an alternating output when the gated outputs are in substantial agreement, and otherwise providing a constant level output;
   first means connected to the comparator and to the first multiplexing means and responsive to the alternating comparator output for providing an address for the first multiplexing means;
   second means connected to the comparator and to the second multiplexing means and responsive to the alternating comparator output for providing an address for the second multiplexing means;
   each of the first and second means including means connected to the comparator for dividing the frequency of the alternating output therefrom, counting means connected to the frequency dividing means and to a corresponding multiplexing means, and responsive to the divided comparator output for providing the address for said multiplexing means; and
   the counting means in each of the first and second means being normally synchronized, with an internal system failure rendering the counters desynchronized, whereupon the gated outputs are otherwise than in substantial agreement and the comparator means provides the constant level output.

2. A system as described by claim 1, wherein:
   the counting means is responsive to the constant level output from the comparator means to stop counting, and to thereby render the system in a latched condition which is indicative of a fault in the multi-bit logic word.

3. A system as described by claim 1, wherein each of the first and second means further includes:
   means for resetting the frequency dividing means and the counting means.

4. A system as described by claim 1 including means for testing the second multiplexing means, said testing means including:

means for applying a test signal at a predetermined logic level to the first and second gating means;

the first gating means responsive to the test signal for blocking the output from the first multiplexing means; and the second gating means including means responsive to the test signal for being set by the output of the second multiplexing means for testing said means.

5. A system as described by claim 1, wherein the frequency dividing means in each of the first and second means includes:

a flip-flop connected to the comparator means; and a voltage limiting device connected intermediate the comparator and the flip-flop.

6. A system as described by claim 1, wherein each of the first and second multiplexing means includes:

a first multiplexer for multiplexing a portion of the bits of the word multiplexed by the multiplexing means; and a second multiplexer for multiplexing the remaining bits of said word.

* * * * *